United States Patent [19]

Rüger

[11] Patent Number: 4,576,432
[45] Date of Patent: Mar. 18, 1986

[54] AIMING OR SIGHTING APPARATUS WITH SYNCHRONOUSLY ROTATING THERMAL IMAGER AND AIMING HEAD

[75] Inventor: Roderich Rüger, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 640,510

[22] Filed: Aug. 13, 1984

[30] Foreign Application Priority Data

Aug. 17, 1983 [DE] Fed. Rep. of Germany ....... 3329671

[51] Int. Cl.[4] .................. G02B 23/04; G02B 23/08; G02B 23/12
[52] U.S. Cl. ........................... 350/1.2; 350/538; 350/539; 250/213 VT; 250/334; 358/87; 358/113
[58] Field of Search ............. 350/538, 539, 1.2, 541, 350/557, 558; 250/213 VT, 334; 358/87, 113, 222

[56] References Cited

U.S. PATENT DOCUMENTS 3,634,622  1/1972  Wheeler ........................... 350/538
4,260,217  4/1981  Traeger et al. ................... 350/538

FOREIGN PATENT DOCUMENTS 0057304   8/1982  European Pat. Off. .
1203491  10/1965  Fed. Rep. of Germany ....... 350/1.2
2623399  12/1977  Fed. Rep. of Germany .
1254400  11/1971  United Kingdom .
2106267   4/1983  United Kingdom .
2126042   3/1984  United Kingdom .

*Primary Examiner*—Jon W. Henry
*Attorney, Agent, or Firm*—W. G. Fasse; D. H. Kane, Jr.

[57] ABSTRACT

An aiming apparatus, for example, for aiming at a target, has an aiming head (11), an ocular unit (13) and a display section (22) between the aiming head and the ocular unit. The display section (22) has, for example, a thermal imager (24) and a cathode ray tube (26, 27) operated by the thermal imager for displaying a thermal image received through a beam splitter. The aiming head (11) and the ocular unit include the required optical elements and an ocular (19). Each section has its respective housing. The housing of the aiming head (11') is rotably interconnected for rotation about its normally vertical axis (30) at least with the thermal imager (24) rotatable about its horizontal axis (23) in a corresponding synchronous rotation, whereby the screen (27) and any image on the screen of the cathode ray tube (26) retain their relationship unchanged even if the aiming head is rotated by a pointer through an azimuth angle. This is so because the aiming head and the thermal imager rotate with the same angles.

6 Claims, 6 Drawing Figures

AIMING OR SIGHTING APPARATUS WITH SYNCHRONOUSLY ROTATING THERMAL IMAGER AND AIMING HEAD

FIELD OF THE INVENTION

The invention relates to an aiming or sighting apparatus for aiming at a target. Such devices normally include an aiming head, a display section and an ocular unit. The aiming head has a sighting or aiming mirror for deflecting target image rays which are transmitted to the display section where they are converted for display on an image screen, or to an ocular for direct viewing.

DESCRIPTION OF THE PRIOR ART

In aiming or sighting devices of the type just described, the rays received by the aiming or sighting mirror are reflected to the display section which transforms the received rays into an image that may be observed on an image screen through an ocular or eye piece by the operatur also referred to as the "pointer".

The display section may comprise, for example, a thermal imager connected to a cathode ray tube or to a display screen made of light emitting diodes. The display section may also comprise a television camera and display devices modified for sighting or aiming purposes. The image display screens of these devices generally have a viewing field which is not round, but rather, approximates a rectangle. Further, in those instances where a thermal imager is involved, the image display screen also shows the line structure which is due to the sampling process required for converting infrared scenes into a visible image.

In devices of the type just described, there exists the problem that rotation of the aiming head about its vertical or high axis, that is, rotation in an azimuth direction causes a slanting of the target. In other words, the pointer sees the viewed image on his ocular at a slanting angle which corresponds to the azimuth sighting angle. It is possible to solve this problem, partially by an image erection prism installed in the ocular unit. Such a prism rotates the image into the upright position, however, simultaneously the contour of the image screen including the line structure that may be present on an infrared display screen, is tilted in accordance with the azimuth sighting angle. When the sighting angle happens to be, for example, 90°, the image screen is also rotated by 90° so that the image screen is visible in the ocular or eye piece in a way presenting the image screen with its length extending vertically, whereby the field of view for the pointer is substantially diminished in the horizontal direction.

OBJECTS OF THE INVENTION

In view of the above it is the aim of the invention to achieve the following objects singly or in combination:

to construct an aiming or sighting apparatus or device in such a way that the image on the screen, including the imaged scene remain tilted when an azimuth sighting movement is made by the pointer so that the scene and the image on the screen remain in the unchanged or zero position in the eye piece or ocular of the pointer;

to make the imaged scene and the image on the screen independent of the azimuth sighting angle; and to mechanically or electrically synchronize the azimuth rotation of the aiming head and the rotation of the thermal imager with each other.

SUMMARY OF THE INVENTION

The above objectives have been achieved in an apparatus as described above, by making sure that at least the thermal imager in the display device rotates about its longitudinal axis in synchronism with the azimuth angle of the aiming head of the apparatus when the aiming head is rotated about its high, normally vertically extending axis during an aiming motion with the azimuth angle. The follower movement at least of the thermal imager about its normally horizontal axis is a rotation in the same direction as the rotation of the aiming head about its normally vertical axis.

The synchronous rotation between the aiming head and the thermal imager in accordance with the azimuth sighting angle provides a surprisingly simple solution for the above stated problem which is applicable to all aiming or sighting apparatus with the important advantage that the imaged scene and the contour of the image screen remain always in the desired upright or zero position relative to each other independently of the aiming angle. This applies also to the image orientation and to the line structure of the cathode ray tube display screen of a thermal imager. This advantage is achieved according to the invention with such synchronous rotation and the invention provides a complete solution of the above mentioned problem rather than only a partial solution as has been the case with an image erection prism alone.

BRIEF FIGURE DESCRIPTION

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
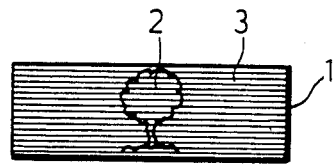
FIG. 1 shows an image screen illustrating a target such as a tree, with the target and image screen shown in their normal zero orientation position.
Figure 3:
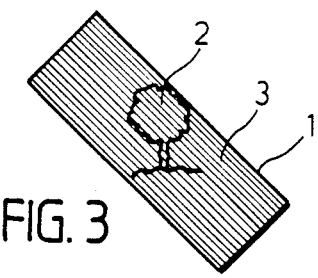
FIG. 3 illustrates a 45° azimuth aiming movement toward the left with a scene correction accomplished by means of an image erection prism.
Figure 4:
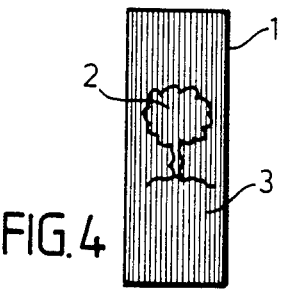
FIG. 4 illustrates a 90° azimuth aiming movement and a correction of the scene or target by means of an image erection prism.
Figure 5:
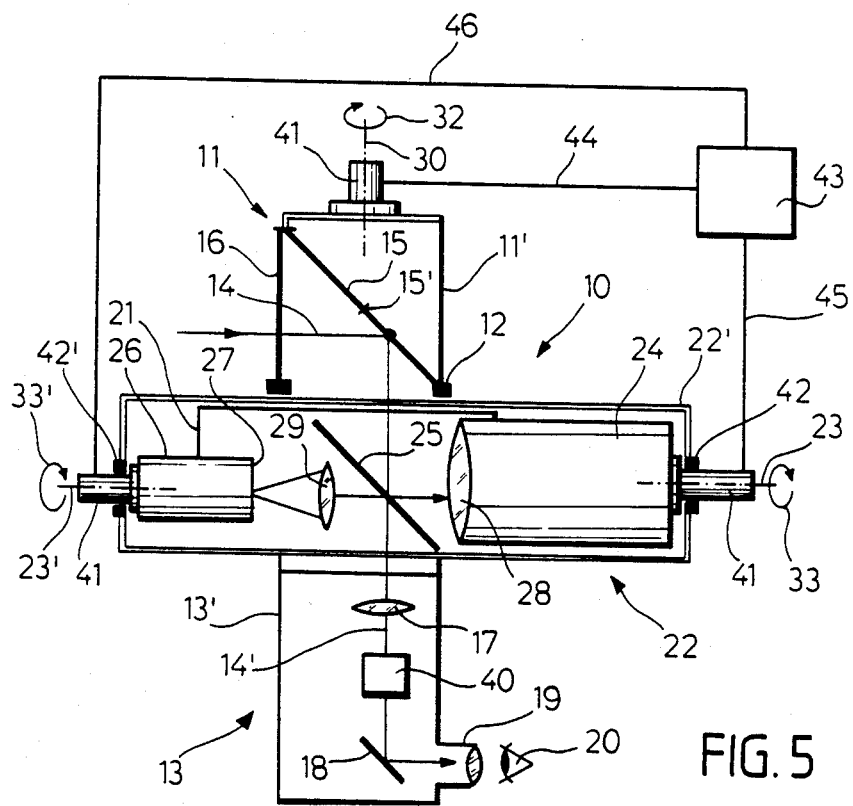
FIG. 5 shows a schematic illustration of a sighting or aiming apparatus for day-sight or night-sight according to the invention and FIG. 6 shows a schematic illustration according FIG. 5 only for night-sight.

FIGS. 1 to 4 illustrate in a simplified representation an image screen 1 which is coincident with a screen 27 on the front face of a cathode ray tube 26 shown in FIG. 5. A thermal imager 24 receives the radiation which represents the target such as a tree 2 and converts the radiation information into respective electrical signals which are in turn processed for display on the screen 1 or 27 by the cathode ray tube 26. The screen 1 also shows the line structure 3. In FIG. 1 the target 2 and the lines 3 on the screen 1 are shown in their normal orientation with the lines 3 extending horizontally as is the case in any sighting or aiming apparatus provided with a built-in thermal imager, as the aiming head is directed straight onto the target.

Figure 2:
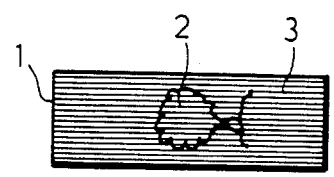
FIG. 2 illustrates a view similar to that of FIG. 1, however, after an azimuth aiming motion by 90° without any image erection.

In FIG. 2 the tree is shown in a horizontal orientation, rather than in a vertical orientation, as the result of a 90° aiming movement of the aiming head without any auxiliary means for erecting the image of the target.

FIGS. 3 and 4 illustrate the orientation of the image screen 1 in the viewing field of the pointer, whereby FIG. 3 shows a 45° azimuth aiming motion while FIG. 4 illustrates a 90° aiming motion. In each instance the image has been corrected with the aid of an image erecting prism. Thus, the target 2 appears in its vertical, normal orientation. However, the image screen 1 does not appear in its normal horizontal orientation as shown in FIG. 1, and this is unsatisfactory for a proper observation of the intended scene. Thus, it is desirable that the pointer is able to see the screen 1 and the target 2 in the orientation of FIG. 1 independently of any aiming motion.

FIG. 5 illustrates schematically an aiming or sighting apparatus 10 for day-sight or night-sight according to the invention comprising an aiming head 11 with a first housing 11', an ocular unit 13 with a second housing 13' and between the aiming head 11 and the ocular unit 13 a display section 22 having a third housing 22' with a first longitudinal axis 23 extending normally horizontally. The aiming head 11 rotates normally around its upright, vertically extending axis 30 with the aid of bearings 12. The third housing 22' of the display section 22 is rigidly coupled with the second housing 13' of the ocular unit 13.

The first housing 11' of the aiming head 11 has an inlet window 16 and an aiming or sighting mirror 15 which is tiltable about a pivot 15' as is conventional. The second housing 13' of the ocular unit 13 comprises an ocular 19 for viewing by an operator or pointer 20. Light or heat radiation 14 coming from a target is deflected by the sighting mirror 15 and travels through a beam splitter 25, through a lens 17, along the path 14' through an image erection prism 40, to a deflection mirror 18 for viewing in the ocular 19. Thus, the pointer 20 can see a scene appearing in the window 16.

The display section 22 comprises in its third housing 22', as mentioned, a thermal imager 24 which receives through the beam splitter 25 and an entrance lens 28 any heat radiation which is converted by the thermal imager 24 into electrical signals. These signals are supplied to the cathode ray tube 26 which is conventionally connected to the thermal imager 24 by a cable 21. The beam splitter 25 passes the light radiation to the ocular 19, however, it reflects the heat radiation toward the entrance lens 28. The screen 27 on the front face of the cathode ray tube 26 projects the image through an optical lens 29 which directs the heat image onto a reflection mirror on the back of the beam splitter 25, for passing the heat image through the lens 17 and onto the deflection mirror 18 for viewing through the ocular 19.

The thermal imager 24 and the cathode ray tube 26 are pivoted in the third housing 22' of the display section 22 with the aid of bearings 42 and 42'. The movement of the thermal imager 24 and of the cathode ray tube 26 are synchronous with the azimutal directional movement of the aiming head 11. As shown in FIG. 5 the synchroneous rotation is accomplished by fractional horsepower electrical servomotors 41 which are flanged to the aiming head housing 11', to the thermal imager 24 and to the cathode ray tube 26. The electrical motors 41 are connected to a control unit 43 by electrical conductor wires 44, 45 and 46 for enforcing the synchroneous rotation.

When the aiming head 11 is rotated in a given direction in a sighting operation for example, in a clockwise direction when facing the free end of the motor 41, as symbolically indicated by the arrow 32 about the vertical axis 30, the thermal imager 24 and the cathode ray tube 26 are rotated in synchronism in the same given direction, namely in a clockwise direction as indicated by the arrows 33, 33' respectively about the normally horizontal respective axis 23, 23'. The electrical motors 41 permit this type of rotation. When the aiming head 11 is rotated in the opposite direction, the thermal imager 24 and the cathode ray tube 26 also rotate in the opposite direction.

The thermal imager 24 and the cathode ray tube 26 are electrically interlocked, so that a scanline of the thermal imager 24 is to be seen as a line on the cathode ray tube 26 and not for instance as a column.

If the aiming or sighting apparatus 10 is used for sighting in daylight, the image erection prism 40 will erect the direct viewing image for any azimutal directional movement of the aiming head 11 around the axis 30. The image erection prism 40 rotates also the thermal image visible on screen 27 for the pointer 20. For that reason the cathode ray tube 26 must rotate around a second horizontal axis 23', that is in the same direction as the thermal imager 24 rotates around its horizontal axis 23. This rotation is also done with the aid of the electrical motors 41. Thus, it is assured that the pointer 20 sees a direct viewing image of the target and the thermal image visible on screen 27 always in the same orientation relative to each other as shown in FIG. 1 independently of any aiming movement.

The described correction can be achieved even in connection with display devices comprising components different from those illustrated in FIG. 5. Thus, the cathode ray tube 26 may be replaced by a panel of light emitting diodes or the components 24, 26 may be replaced by television camera and television screen display means.

Figure 6:
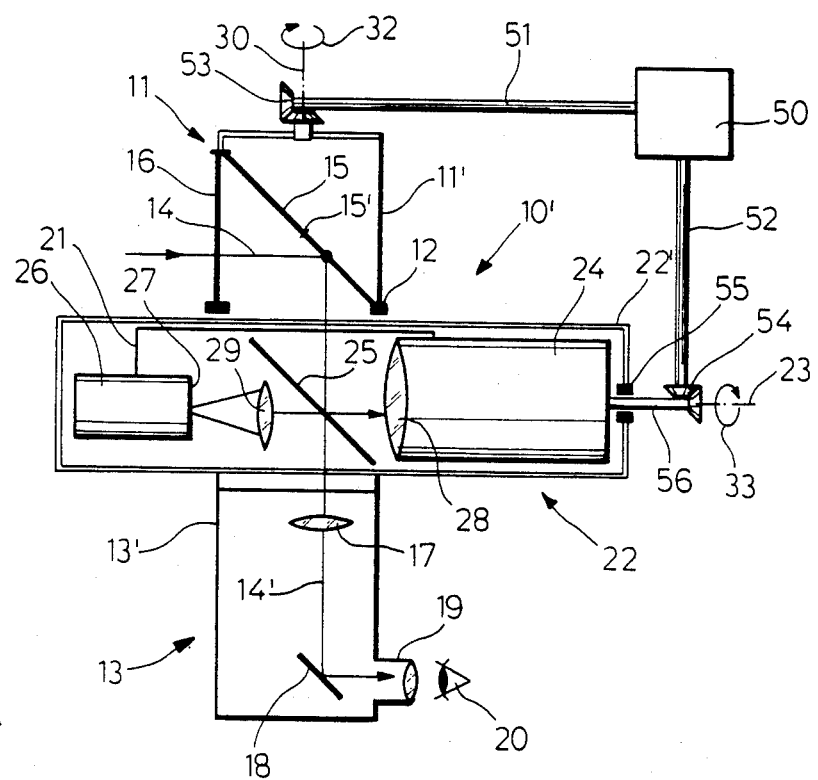

In FIG. 6 is shown an aiming or sighting apparatus 10' in which only the thermal imager 24 is used and which can also be operated as an omnidirectional detection system. Therefore the image erection prism 40 which is only for the direct viewing in FIG. 5 may be omitted in the apparatus of FIG. 6 which uses only the infrared beams. Thus it is not necessary to rotate the cathode ray tube 26. It is sufficient to maintain only the horizontal thermal image on the screen 27 by rotating the thermal imager 24 around the axis 23 in synchronism with the aiming motion of the aiming head 11 around the axis 30. This rotation in a clockwise direction as indicated by the arrows 32 and 33, is produced with the aid of a synchromesh gear 50, two driving shafts 51 and 52 and two bevel gears 53 and 54. The bevel gear 53 is connected to the aiming head housing 11'. The bevel gear 54 drives a shaft 56, which is journalled in a bearing 55 of the housing 22' and is connected with the thermal imager 24. With the described aiming or sighting apparatus 10' the pointer 20 can see in any azimuthal direction the thermal image visible on the screen 27 in the image format, line structure and image content as shown in FIG. 1.

Although the invention has been described with reference to specific example embodiments, it will be appreciated, that it is intended, to cover all modifications and equivalents within the scope of the appended claims.

What is claimed is:

1. An aiming or sighting apparatus for aiming at a target, comprising an aiming head (11) having a vertically extending axis (30), an ocular unit (13) and a display section (22), means mounting said aiming head for rotation normally around said vertically extending axis (30), means linking said ocular unit (13) with said display section (22), said aiming head (11) having a first housing (11') with an inlet window (16) and a tiltable aiming mirror (15), said ocular unit (13) having a second housing (13') and lens means (17), a deflection-mirror (18) and an ocular (19) in said second housing (13'), said display section (22) normally extending horizontally and having a third housing (22'), a beam splitter (25), a thermal imager (24) having a first horizontal axis (23), a cathode ray tube (26) having a screen (27) and a second horizontal axis (23'), and an optical lens (29) operatively arranged in said third housing, a cable (21) operatively connecting said thermal imager (24) to said cathode ray tube (26), and interconnected drive means (41) operatively connected to said aiming head (11) and to said thermal imager (24) for rotating said aiming head and said thermal imager (24) in synchronism with each other about said vertically extending axis (30) and about said first horizontal axis (23) respectively, whereby an image with the target (2) and line structures (3) of a screen (1) are maintained in an original horizontal orientation on said screen (27) of said cathode ray tube (26) relative to an image received even after an azimuth rotation of said aiming head (11).

2. The aiming or sighting apparatus of claim 1, wherein a rotation of said aiming head (11) by said interconnected drive means in a given direction about said vertically extending axis (30) causes a rotation of said thermal imager (24) about said horizontal axis (23) in the same direction as said given direction and vice versa.

3. The aiming or sighting apparatus of claim 1, wherein said beam splitter (25) is arranged for receiving image information from said aiming head (11) for splitting said image information into thermal image information transmitted to said thermal imager (24) and into visible image information transmitted to said ocular (19) for viewing by a pointer.

4. The aiming and sighting apparatus of claim 3, usable for acquiring a directly visible image and a thermal image, wherein, in addition to said aiming head (11) and said thermal imager (24), said cathode ray tube (26) is also operatively connected to said interconnected drive means (41) for rotation in synchronism with each other about said vertically extending axis (30), about said first horizontal axis (23), and about said second horizontal axis (23'), respectively and wherein an image erection prism (40) is interposed in said ocular unit second housing (13') in the path of radiation (14) between said lens means (17) and said deflection-mirror (18).

5. The aiming and sighting apparatus of claim 4, wherein said interconnected drive means (41) for rotating in synchronism said aiming head (11), said thermal imager (24) and said cathode ray tube (26) comprise fractional horsepower electrical servomotors (41), and a control unit (43) connected to said electrical servomotors (41) by electrical wires (44, 45, 46) for said rotating in synchronism.

6. The aiming and sighting apparatus of claim 1, wherein said interconnected drive means for rotating said aiming head (11) and said thermal imager (24) in synchronism comprise bevel gears (53, 54), a synchromesh gear (50), and driving shafts (51, 52) operatively interconnecting said bevel gears with said synchromesh gear for said rotating in synchronism.

* * * * *